United States Patent [19]
Hecht et al.

[11] Patent Number: 6,026,112
[45] Date of Patent: Feb. 15, 2000

[54] DELIVERY SYSTEM FOR HIGH POWER MULTI-WAVELENGTH LASER SYSTEMS

[75] Inventors: Hartmuth Hecht, Burlingame; Mark Lange, Applegate; James Hobart, Los Altos Hills, all of Calif.

[73] Assignee: Coherent Inc., Santa Clara, Calif.

[21] Appl. No.: 08/963,120

[22] Filed: Oct. 28, 1997

Related U.S. Application Data

[63] Continuation of application No. 08/599,065, Feb. 9, 1996, abandoned.

[51] Int. Cl.[7] ........................................................ H01S 3/08
[52] U.S. Cl. ................................. 372/99; 372/23; 372/100
[58] Field of Search .................................. 372/55, 58, 32, 372/94, 75, 100, 97, 93, 59

[56] References Cited

U.S. PATENT DOCUMENTS

| | | | |
|---|---|---|---|
| 3,913,582 | 10/1975 | Sharon | 128/303.1 |
| 4,547,885 | 10/1985 | Allen et al. | 372/58 |
| 4,589,729 | 5/1986 | Bridges et al. | 350/96.32 |
| 4,661,958 | 4/1987 | Bowes et al. | 372/59 |
| 4,852,114 | 7/1989 | Karube | 372/58 |
| 4,896,015 | 1/1990 | Taboada et al. | 219/121.78 |
| 4,917,083 | 4/1990 | Harrington et al. | 606/15 |
| 4,955,027 | 9/1990 | Piper et al. | 372/32 |
| 5,066,294 | 11/1991 | Cosmescu | 606/11 |
| 5,084,882 | 1/1992 | Hughes | 372/75 |
| 5,112,328 | 5/1992 | Taboada et al. | 606/4 |
| 5,343,391 | 8/1994 | Mushabac | 364/413.28 |
| 5,357,365 | 10/1994 | Ipposhi et al. | 359/205 |

OTHER PUBLICATIONS

English language copy of a Search Report from a foreign patent office, issued in a counterpart application, which refers to the relevant portions of the references.

*Primary Examiner*—Leon Scott, Jr.
*Attorney, Agent, or Firm*—Limbach & Limbach L.L.P.

[57] ABSTRACT

A laser beam delivery system that uses total internal reflection inside prisms to redirect the high powered broadband output laser power from a laser beam source to the intended target. An articulated arm having straight segments connected end to end by rotatable joints attaches to a laser source that produces a laser output beam having at least two wavelengths. A prism is located at each joint wherein the laser output beam travelling down each of the segments is re-directed down the subsequent segment. The prisms are oriented to re-direct the laser beam by total internal reflection. Anti-reflective coatings are formed on each prism surface where the beam enters and exits each of the prisms.

11 Claims, 3 Drawing Sheets

DELIVERY SYSTEM FOR HIGH POWER MULTI-WAVELENGTH LASER SYSTEMS

This is a continuation of co-pending application Ser. No. 08/599,065 filed on Feb. 9, 1996, now abandoned.

FIELD OF THE INVENTION

The present invention relates to laser systems, and more particularly to a delivery system for high powered, multi-wavelength laser systems.

BACKGROUND OF THE INVENTION

Presently, it is known to deliver the output beam exiting from a laser system to an intended target using an articulated arm attached to the laser system. An articulated arm is a series of straight segments connected together by rotatable joints. A mirror is placed at each joint such that the laser beam travelling down each of the segments is re-directed down the subsequent segment. The beam is incident on the surface of each mirror at an angle of 45°.

Recently, high power, multiple wavelength laser systems have been developed, whereby the traditional articulated arm has become inadequate for laser beam delivery. While broadband coatings can be used on the mirrors at each joint, such coatings are very difficult to develop. Broadband reflective coatings tend to have a lower damage threshold than other coatings, which will then fail when used to reflect higher power laser beams. Further, the broadband coating design is complicated by the fact that the beam is incident upon the reflecting surface at an angle at 45°. Lastly, reflections at such an angle tend to reflect the S and P polarizations of the beam differently.

There is a need for a laser beam delivery system that delivers a high powered, multi-wavelength laser beam with the flexibility of an articulated arm without adversely affecting the S and P polarizations of the laser beam.

SUMMARY OF THE INVENTION

The present invention solves the aforementioned problems by providing a delivery system that uses total internal reflection inside prisms to redirect the output laser beam from the laser beam source to the intended target.

An articulated arm having straight segments connected end to end by rotatable joints attaches to a laser source that produces a laser output beam having at least two wavelengths. A prism is located at each joint wherein the laser output beam travelling down each of the segments is re-directed down the subsequent segment. The prisms are oriented to re-direct the laser beam by total internal reflection. Anti-reflective coating are formed on each prism surface where the beam enters and exits each of the prisms.

Other objects and features of the present invention will become apparent by a review of the specification, claims and appended figures.

DETAILED DESCRIPTION OF THE PREFERRED EMBODIMENTS

The present invention is a delivery system capable of directing a high powered multi-wavelength laser beam to an intended target. The laser beam is directed to the intended target without using high reflective broadband coated mirrors that can be easily damaged or adversely affect the polarization of the laser beam.

Figure 1:
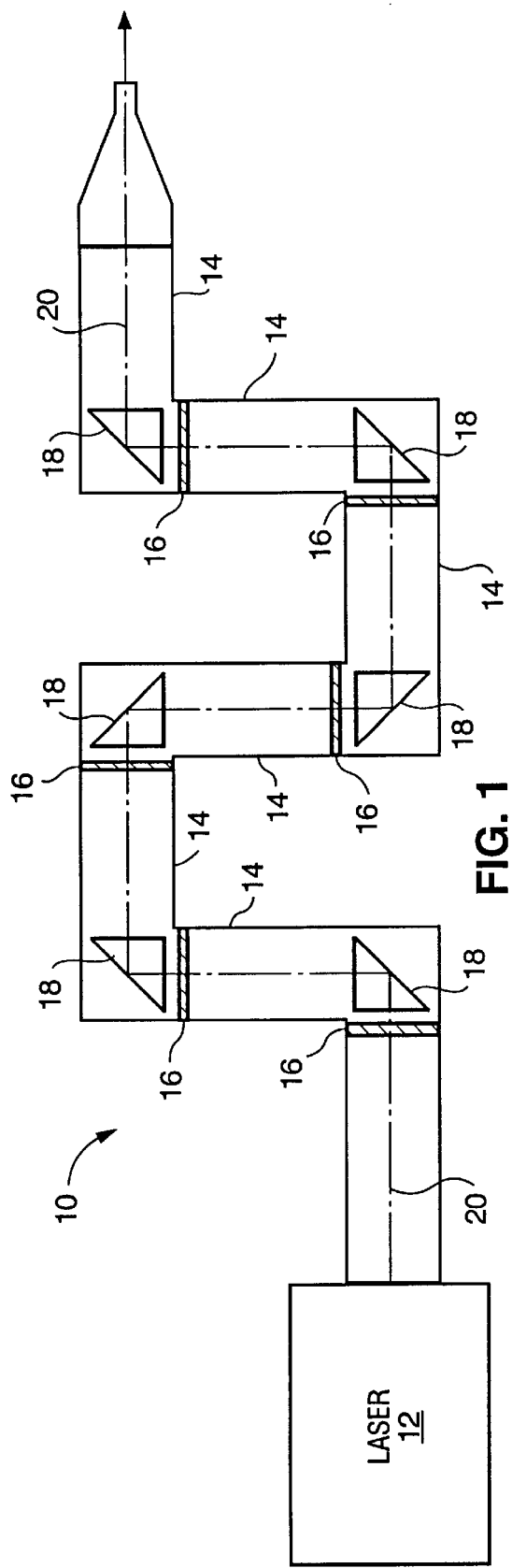
FIG. 1 is a plan view of the laser and articulated arm delivery system of the present invention.
Figure 2:
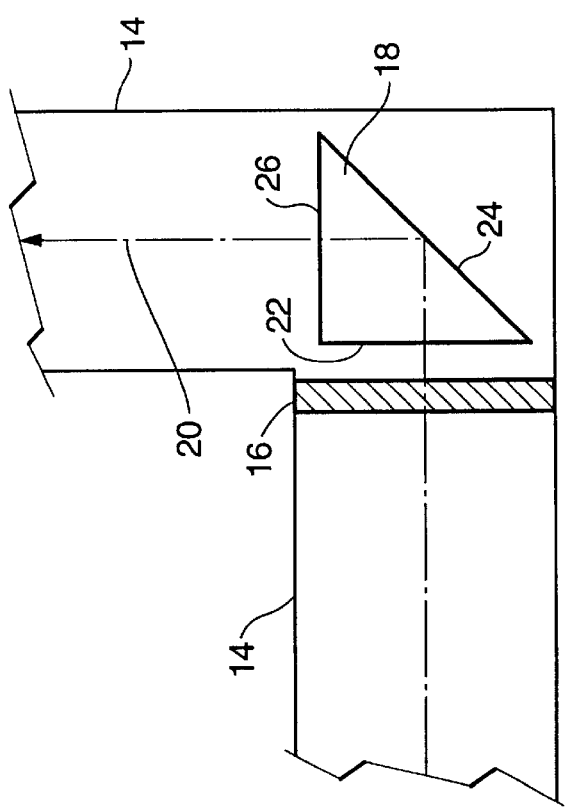
FIG. 2 is a cross-sectional view of a prism located at a rotatable joint in the articulated arm of the present invention.

The delivery system of the present invention is an articulated arm 10 that attaches to a laser system 12, as illustrated in FIGS. 1 and 2. The articulated arm 10 includes straight segments 14 connected together by rotatable joints 16. At each joint 16, a prism 18 is positioned such that a laser beam 20 travelling down each of the segments 14 is re-directed down the subsequent segment 14 by total internal reflection. It is within the scope of this invention to put a second joint 16 on the other side of each prism 18 from the first joint 16 illustrated in the drawings.

Each prism 18 has an input surface 22 where laser beam 20 enters the prism, a back surface 24 off of which beam 20 is totally internally reflected, and an output surface 26 through which the beam 20 exits the prism 18. Prisms 18 are shaped and positioned so that beam 20 impinges both input and output surfaces 22/26 at a normal angle of incidence. This angle of incidence minimizes reflective losses at each surface. Further, both input and output surface 22 and 26 have an antireflection coating thereon. The antireflection coating minimizes any reflective losses that might occur as beam 20 enters and exits prisms 18.

During operation, beam 20 passes through the articulated arm 10, wherein each prism 18 redirects beam 20 by total internal reflection off of back surface 24. No high reflective coatings are used to reflect the beam 20. The only optical coatings present are the anti-reflective coatings on surfaces 22 and 26. By utilizing anti-reflective coatings and total internal reflection, broadband reflective coatings that are easily damaged and adversely affect the S and P polarizations are avoided.

The delivery system of the present invention is ideal for laser systems that produce high power output beams at more than one wavelength. Examples of such laser systems include tunable laser systems, doubling laser systems that produce a fundamental wavelength and a second wavelength output from a non-linear crystal, and composite laser systems.

A composite laser system contains a plurality of cavities, each having a different gain medium. Each cavity is designed to produce a unique output beam, with its own output power, pulse width, and wavelength. Such a laser system is capable of producing continuous or pulsed output, long pulses or short pulses, high or low power, and all at a wide variety of different power levels and wavelengths.

Figure 3:
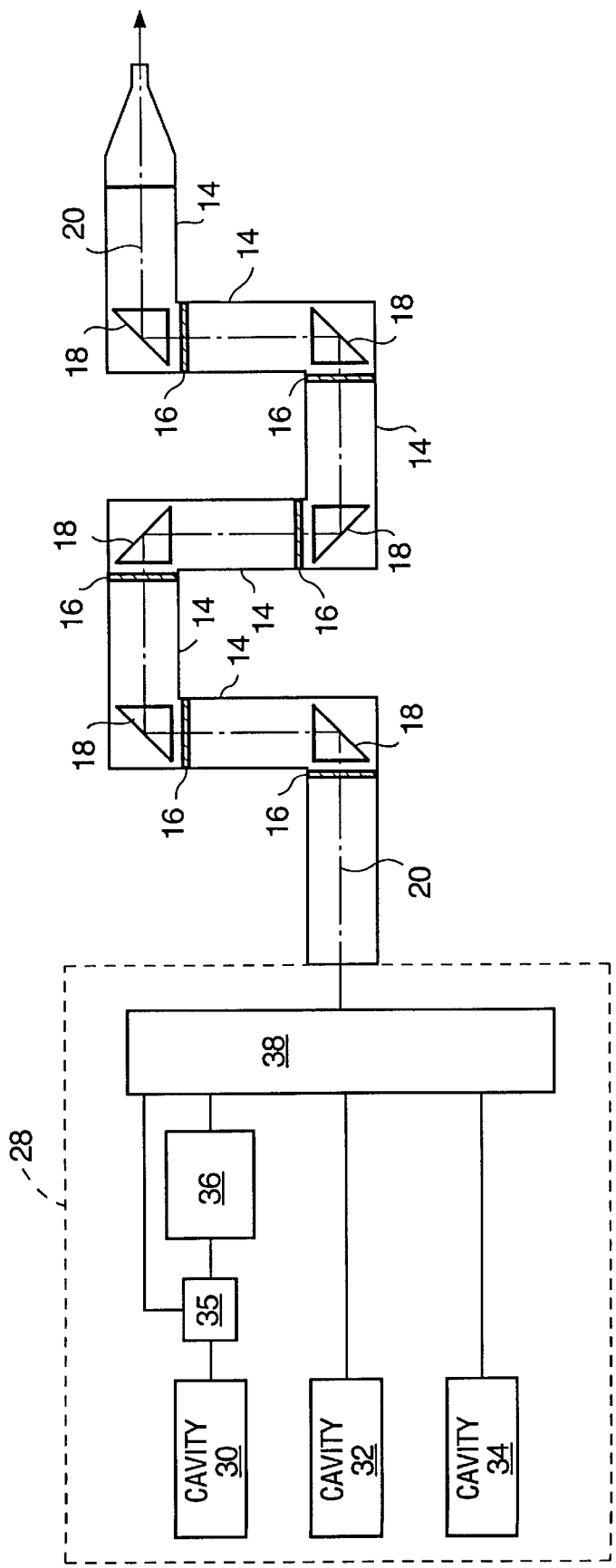
FIG. 3 is a plan view of a composite laser system incorporating the articulated arm delivery system of the present invention.

A composite laser system 28 using the delivery system of the present invention which is being developed for commercial release is illustrated in FIG. 3. This composite laser system includes three laser cavities 30, 32, and 34, an external doubling crystal 36, and a combining means 38 for combining the separate beams from the cavities 30/32/34 into a single laser system output beam 20. Cavity 30 is a Q-switched Nd:Yag laser cavity that produces 1064 nm light at 10 Hz with pulse energies of 400 mJ and pulse widths of 5 ns. Cavity 32 is an intra-cavity doubled Nd:Yag laser cavity using a KTP doubling crystal that produces 532 nm light at 6 Hz with pulse energies of about 0.2–1.75 J and pulse widths of 2–10 ms. A laser formed in this manner is described in greater detail in co-pending application Ser. No.

08369,465, filed Jan. 6, 1995, assigned to the same assignee as herein. Cavity 34 is a Q-switched Alexandrite laser cavity that produces 755 nm light at 10 Hz with pulse energies of 500 mJ and pulse widths of 60 ns. A selection device 35 is mounted to intercept the output of the cavity 30 and alternately direct the output beam directly to the combining means 38, or to the external doubling crystal 36. When the output beam from cavity 30 is directed to the external doubling crystal 36, the crystal produces 532 nm light at 10 Hz with pulse energies of 200 mJ and pulse widths of 4 ns. The crystal output, combined with the residual fundamental output from cavity 30, can be separated before entering combining means 38, or by combining means 38. Therefore, this composite laser system is capable of four different possible unique output beams. These unique beams are combined by the combining means 38 to form a single output beam 20. The combining means 38 can be rotating mirrors or a prism, that capture a given unique beam and reflect that beam out as the output beam 20.

Reflective mirrors were found to be inadequate when used in the articulated arm of the laser system 28 described above because the broadband optical coatings could not withstand the optical power densities of the output beams. Specifically, broadband coatings on mirrors angled at 45° that efficiently reflected the three wavelengths (532 nm, 755 nm, and 1064 nm) were damaged by the 200 mJ pulses of 532 nm laser light and the 400 mJ pulses of 1064 nm laser light, where the beam had a diameter of 7 mm. The effective area of the beam on the reflective coating at 45° to the incoming beam is:

$$\text{Effective Area} = \pi(3.5 \text{ mm})^2 (2)^{1/2} = 54.42 \text{ mm}^2 = 0.5442 \text{ cm}^2 \quad (1)$$

The power of the 532 nm beam per pulse is:

$$\text{Power/Pulse} = \frac{0.2 \text{ J}}{5 \text{ ns}} = 40 \text{ MWatts} \quad (2)$$

Therefore, the power density during each pulse for the 532 nm beam is:

$$\text{Power Density} = \frac{40 \text{ MWatts}}{0.5442 \text{ cm}^2} = 73.5 \text{ MWatts per cm}^2 \quad (3)$$

Therefore, the prisms 18 and anti-reflection coatings on surfaces 22 and 26 must withstand a power density of about 70 MWatts/cm$^2$ at 532 nm without being damaged. Further, since the power of the 1064 nm beam is twice that of the 532 nm beam, the optical coatings must withstand a power density of about 140 MWatts/cm$^2$ at 1064 nm without being damaged.

The prisms 18 used in the articulated arm attached to the above mentioned composite laser system are preferably made of high purity grade fused silica (quartz suprasil). The high purity grade is preferred to avoid any losses or self focusing due to non-linear effects from the beam 20 travelling through the solid prism 18.

Figure 4:
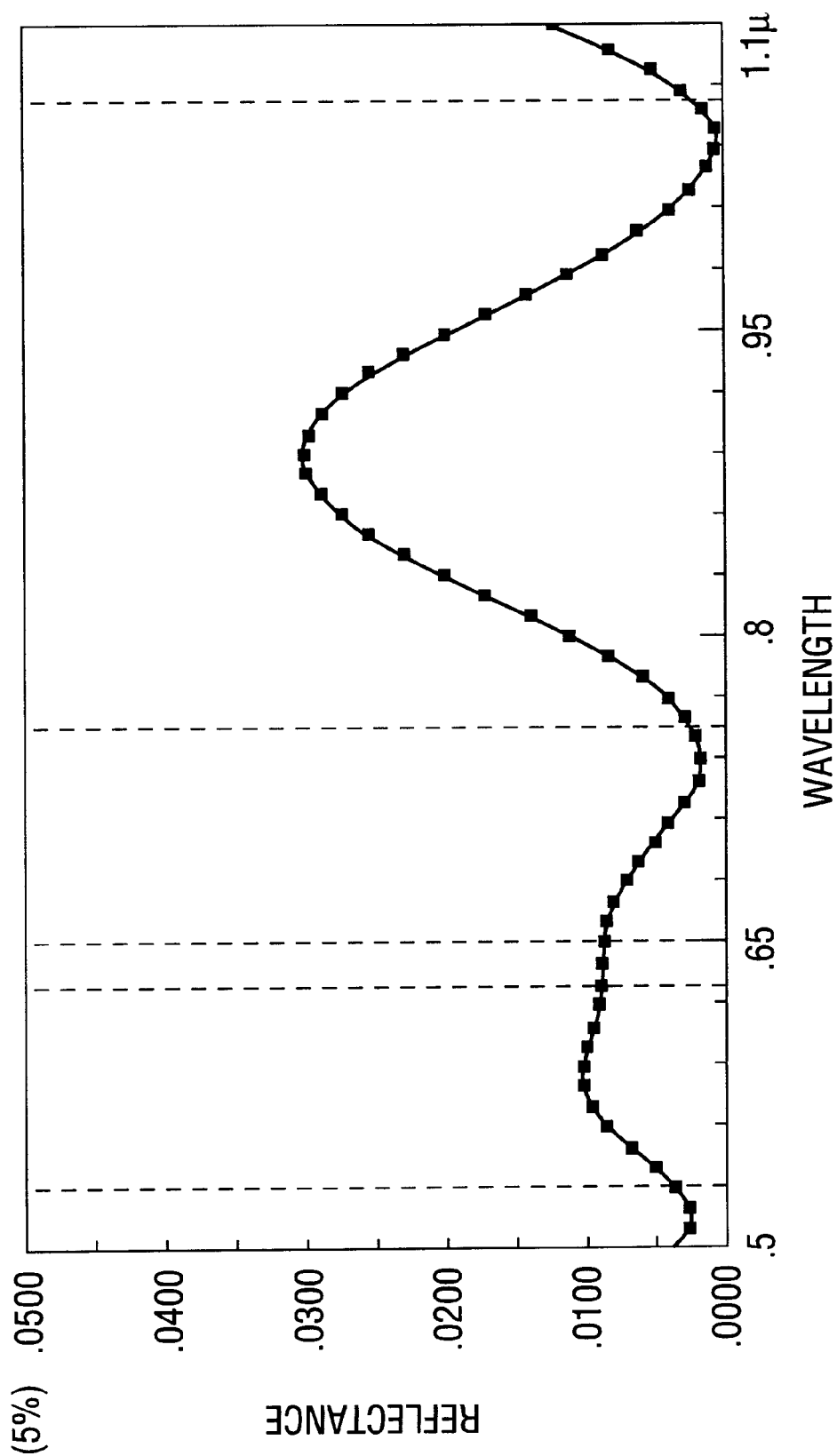
FIG. 4 is a plot graph illustrating the reflective properties of an anti-reflective coating formed from silicon dioxide and hafnium dioxide.

The antireflection coatings on surfaces 22 and 26 used with the laser system 28 can include one or more materials in a single or multiple layers that can withstand the 70 or 140 MWatt power densities as described above, yet induce very little reflection of laser light at all the output wavelengths of the laser (in this case: 532 nm, 755 nm, and 1064 nm). These materials can include zirconia, tantale, alumina, magnesium fluoride, scandium oxide, hafnium dioxide, silicon dioxide and titania. The particular anti-reflection coating used by the assignee that highly transmits 532 nm, 755 nm, and 1064 nm is a nine layer coating formed of alternating layers of silicon dioxide and hafnium dioxide. This antireflection coating has minimal reflective properties at 532 nm, 755 nm, and 1064 nm wavelengths, as illustrated in FIG. 4. The 70 MWatts/cm$^2$ power density of 532 nm light, and the 140 MWatts/cm$^2$ power density of the 1064 nm light, did not damage the nine layer silicon dioxide and hafnium dioxide anti-reflective coating described above when used on prisms 18 in articulated arm 10.

It is to be understood that the present invention is not limited to the embodiments described above and illustrated herein, but encompasses any and all variations falling within the scope of the appended claims.

What is claimed is:

1. An optical delivery system for directing a laser output beam having at least two discrete wavelengths from a laser system source to an intended target, comprising:

an articulated arm attached to the laser source for delivering said laser output beam to the intended target, said articulated arm having at least first and second straight segments and an intermediate rotatable joint;

a prism having and input face and an exit face, said prism being located in said rotatable joint and oriented such that a laser beam travelling down said first segment is redirected by said prism through total internal reflection into said second segment; and a coating formed on both the input and exit faces of the prism, said coating surfaces located where the beam enters and exits said prisin, said coatings inducing a substantially maximum transmission of the laser beam through said input and exit faces at said at least two discrete wavelengths;

wherein said prisms are shaped and positioned so that the laser beam strikes said input and exit faces at a substantially normal angle of incidence for efficient transmission of said at least two discrete wavelengths of said laser beam through said coatings and said input and exit faces.

2. The optical delivery system of claim 1, wherein said anti-reflective coatings are made of alternating layers of hafnium dioxide and silicon dioxide.

3. The optical delivery system of claim 1, wherein said anti-reflective coatings can withstand a power density of substantially 70 MWatts/cm$^2$ at 532 nm, and a power density of substantially 140 MWatts/cm$^2$ at 1064 nm, without being damaged.

4. A laser system for generating and delivering laser energy of multiple wavelengths to an intended target, the laser system comprising:

a laser source means for producing a laser output beam having at least two discrete wavelengths;

an articulated arm attached to said laser source means for delivering said laser output beam to the intended target, said articulated arm having at least first and second straight segments and an intermediate rotatable joint;

a prism having and input face and an exit face, said prism being located in said rotatable joint and oriented such that a laser beam traveling down said first segment is redirected by said prism through total internal reflection into said second segment; and a coating formed on both the input and exit faces of the prism, said coating surfaces located where the beam enters and exits said prism, said coatings inducing a substantially maximum transmission of the laser beam through said input and exit faces at said at least two discrete wavelengths;

wherein said prisms are shaped and positioned so that the laser beam strikes said input and exit faces at a substantially normal angle of incidence for efficient transmission of said at least two discrete wavelengths of said laser beam through said coatings and said input and exit faces.

5. The laser system of claim 4 wherein the laser source means includes a laser cavity that produces a fundamental laser beam that is focused into a non-linear crystal to produce a secondary beam having a different wavelength from the fundamental beam, the fundamental and secondary beams being included in said laser output beam.

6. The laser system of claim 4 wherein the laser source means is a tunable laser system that can produce two or more discrete output wavelengths.

7. The laser system of claim 4, wherein the laser source means includes:

a plurality of laser cavities, each of said cavities containing a gain medium for outputting a unique laser beam; and means for combining said unique laser beams from said cavities to form said laser output beam.

8. The laser system of claim 7, wherein said cavities include a Q-switched Nd:yag laser cavity, an intra-cavity frequency doubled Nd:Yag laser cavity, and a Q-switched Alexandrite laser cavity.

9. The laser system of claim 7, wherein the laser output beam has a power density of at least substantially 70 MWatts/cm$^2$ with a wavelength of 532 nm.

10. The laser system of claim 7, wherein the laser output beam has a power density of at least substantially 140 MWatts/cm$^2$ with a wavelength of 1064 nm.

11. The laser system of claim 7, wherein the anti-reflective coatings made of alternating layers of hafnium dioxide and silicon dioxide.

* * * * *